United States Patent
Xu

(10) Patent No.: US 8,050,264 B2
(45) Date of Patent: Nov. 1, 2011

(54) SYSTEM AND METHOD FOR RE-ROUTING A MULTICAST STREAM

(75) Inventor: Xiaohu Xu, Guangdong (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 238 days.

(21) Appl. No.: 11/956,387

(22) Filed: Dec. 14, 2007

(65) Prior Publication Data

US 2008/0095161 A1 Apr. 24, 2008

Related U.S. Application Data

(63) Continuation of application No. PCT/CN2006/003600, filed on Dec. 26, 2006.

(30) Foreign Application Priority Data

Mar. 7, 2006 (CN) .......................... 2006 1 0056817

(51) Int. Cl.
*H04L 12/56* (2006.01)

(52) U.S. Cl. ........ 370/390; 370/230; 370/256; 370/392; 709/205; 709/232; 709/238

(58) Field of Classification Search .................. 370/256, 370/390, 392, 230; 709/205, 232, 238; 398/5
See application file for complete search history.

(56) References Cited

U.S. PATENT DOCUMENTS

| 6,112,249 | A | 8/2000 | Bader et al. | |
|---|---|---|---|---|
| 6,728,777 | B1 * | 4/2004 | Lee et al. | 709/238 |
| 7,310,335 | B1 | 12/2007 | Garcia-Luna-Aceves et al. | |
| 7,609,694 | B2 * | 10/2009 | Moki et al. | 370/390 |
| 2003/0043745 | A1 * | 3/2003 | Kano et al. | 370/238 |
| 2003/0088696 | A1 * | 5/2003 | McCanne | 709/238 |
| 2004/0027995 | A1 | 2/2004 | Miller et al. | |
| 2005/0008014 | A1 * | 1/2005 | Mitra et al. | 370/392 |

(Continued)

FOREIGN PATENT DOCUMENTS

CN 1378365 A 11/2002

(Continued)

OTHER PUBLICATIONS

D. Estrin et al, "Protocol Independent Multicast-Sparse Mode (PIM-SM): Protocol Specification", IETF Standard, Internet Engineering Task Force, Jun. 1, 1998, pp. 1-67.

(Continued)

*Primary Examiner* — Robert W Wilson
*Assistant Examiner* — Mohamed Kamara
(74) *Attorney, Agent, or Firm* — Slater & Matsil, L.L.P.

(57) ABSTRACT

A method and system for re-routing a multicast stream is provided. The method for re-routing a multicast stream includes: providing a prior multicast forwarding path corresponding to a first route; establishing a new multicast forwarding path between a downstream router and a second upstream router corresponding to a second route; re-routing a multicast stream from said prior multicast forwarding path to said new multicast forwarding path, wherein said multicast stream utilizes said prior multicast forwarding path until said new multicast forwarding path is operational; and pruning said prior multicast forwarding path when said new multicast forwarding path is operational. Therefore, the multicast stream transmitting will not be interrupted during the switchover process of the multicast forwarding path caused by that a unicast route to a multicast source or a rendezvous point has changed.

16 Claims, 5 Drawing Sheets

U.S. PATENT DOCUMENTS

| | | | |
|---|---|---|---|
| 2005/0069314 A1* | 3/2005 | De Patre et al. | 398/5 |
| 2007/0019646 A1* | 1/2007 | Bryant et al. | 370/390 |
| 2007/0189193 A1* | 8/2007 | Previdi et al. | 370/256 |

FOREIGN PATENT DOCUMENTS

| | | |
|---|---|---|
| CN | 1483266 A | 3/2004 |
| CN | 1741533 A | 3/2006 |
| EP | 1 548 978 A1 | 6/2005 |

OTHER PUBLICATIONS

Aiguo Fei et al, "A Dual-Tree Scheme for Fault-Tolerant Multicast", IEEE International Conference on Communications, Jun. 11, 2001, vol. 3, pp. 690-694.

D. Zappala, "Alternate Path Routing for Multicast", IEEE Computer and Communications Societies, Proceedings, IEEE Tel Aviv, Mar. 26, 2000, vol. 3, pp. 1576-1585.

Chinese Office Action, Application No.: 200680011918.X, dated Apr. 29, 2010, 7 pages.

European Office Action, Application No. 06 840 644.6-2416, dated Jun. 11, 2008, 6 pages.

European Office Action, Application No. 06 840 644.6-2416, dated Oct. 23, 2009, 4 pages.

Estrin, D., et al., "Protocol Independent Multicast-Sparse Mode (PIM-SM): Protocol Specification," Network Working Group Request for Comments: 2362, Obsoletes: 2117, Category: Experimental, Jun. 1998, 59 pages.

Holbrook, H., et al., "Source-Specific Multicast for IP <draft-ietf-ssm-arch-03.txt>," Versions: 00 01 02 03 04 05 06 07 RFC 4607, May 7, 2003, 16 pages.

Estrin, D., et al.: "Protocol Independent Multicast-Sparse Mode (PIM-SM): Protocol Specification; rfc2362.txt" IETF Standard, Internet Engineering Task Force, IETF, CH, Sep. 9, 1997, 52 pages.

Canadian Office Action, Canadian Application no. 2,630,643, Applicant: Huawei Technologies Co., Ltd., Dated: Jan. 25, 2011, 2 pages.

* cited by examiner

SYSTEM AND METHOD FOR RE-ROUTING A MULTICAST STREAM

BACKGROUND OF THE INVENTION

1. Field of the Invention

This invention relates generally to the area of telecommunications, and more particularly to a method and system for re-routing a multicast stream.

2. Description of Related Art

Protocol Independent Multicast (PIM) is a multicast routing protocol independent of unicast routing protocols. It does not depend on a specific unicast routing protocol. When using PIM, reverse path forwarding (RPF) checking can be implemented by using an existing unicast routing table. When using a protocol independent multicast-sparse mode (PIM-SM), a rendezvous point tree (RPT) or a source path tree (SPT) may be established by using Join or Prune messages. Join or Prune messages are explicitly sent by a PIM router. A multicast stream is received by a network segment to which the multicast group belongs via the RPT or SPT. Protocol independent multicast-source-specific multicast (PIM-SSM) is an improvement of PIM-SM. When using PIM-SSM, an SPT is established by using Join or Prune messages explicitly sent by a PIM router, and the process of establishing an RPT and switching between an RPT and an SPT can be bypassed.

With the development and growth of broadband network technologies, more and more network operators provide high-quality Internet protocol television (IPTV) services to the public by deploying PIM multicast networks so as to increase revenue of broadband services. In other words, IPTV provides high-definition broadband video services to the public by using multicast technology in IP networks. Therefore, reliability of PIM multicast networks is very important to network operators.

The process of switching an SPT under conventional PIM-SM technology by changing a unicast route is described as follows:

When a unicast route changes, an RPF checking is done on all active (S,G), (*,G) and (*,*,RP) entries, and all affected incoming interfaces are updated. In particular, if a new incoming interface appears in an outgoing interface list, it is deleted from the outgoing interface list. The previous incoming interfaces may be added to the outgoing interface list by a subsequent Join/Prune message from downstream. Join/Prune messages received on the current incoming interface are ignored. Join/Prune messages received on new interfaces or existing outgoing interfaces are not ignored. Other outgoing interfaces are left as is until they are explicitly pruned by downstream routers or are timed out due to lack of appropriate Join/Prune messages. If a router has an (S,G) entry with an SPT-bit set, and the updated iif(S,G) (Incoming InterFace (Source, Group)) does not differ from iif(*,G) or iif(*,*,RP), then the router resets the SPT-bit.

The router must send a Join message with S in the Join list via a new incoming interface to inform upstream routers that it expects a multicast stream over the new incoming interface. It may also send a Prune message with S in the Prune list via the old incoming interface, if the link is operational, to inform upstream routers that this part of the distribution tree is going away.

In the above conventional PIM-SM technology, if a unicast route to a multicast source changes, for example, the unicast route changes from the second-best route to the best route, a PIM router sends a Join message to a new upstream PIM router to establish a new SPT. If the old incoming interface is still active, the PIM router sends a Prune message to the old upstream PIM router to prune the prior SPT. The inventor of the present invention found that once the prior SPT is pruned, transmitting for a multicast stream is broken until the new SPT is operational.

Therefore, there exists a need for a method for re-routing a multicast stream, which overcomes the problem that transmitting for a multicast stream is broken until the new SPT is operational.

SUMMARY OF THE INVENTION

In a first aspect, a method for re-routing a multicast stream is provided in accordance with an embodiment of the invention. In conventional technologies, transmitting a multicast stream will be broken when a multicast forwarding path switches wherein the switch is caused by that a unicast route to a multicast source or a rendezvous point changes. The method in accordance with an embodiment of the invention can solve the above problem.

According to the method, a prior multicast forwarding path corresponding to a first route is provided. When a unicast route to a multicast source or a rendezvous point changes from the first route to a second route, a new multicast forwarding path between a downstream router and a second upstream router corresponding to the second route is established. A multicast stream utilizes the prior multicast forwarding path until the new multicast forwarding path is operational. When the new multicast forwarding path is operational, the multicast stream is re-routed from the prior multicast forwarding path to the new multicast forwarding path, and the prior multicast forwarding path is pruned.

In a second aspect, a system for re-routing a multicast stream is provided. The system includes a routing module, a forwarding module, a detecting module, an outgoing interface, a first incoming interface and a second incoming interface. The first and second incoming interfaces are configured to receive a multicast stream from upstream routers. The first incoming interface is in communication with a first upstream router corresponding to a first route. The second incoming interface is in communication with a second upstream router corresponding to a second route. The outgoing interface is configured to forward the multicast stream to a downstream device. The forwarding module is configured to forward the multicast stream to the outgoing interface pursuant to an instruction of the routing module wherein the multicast stream is received via an incoming interface designated by the routing module. The detecting module is configured to detect a condition of receiving the multicast stream via the second incoming interface. The routing module is configured to send a first instruction to establish a new multicast forwarding path via the second incoming interface when a unicast route from a downstream router to a multicast source changes from the first route to the second route. The routing module is configured to send a second instruction for pruning a prior multicast forwarding path corresponding to the first route via the first incoming interface upon the condition of receiving the multicast stream via the second incoming interface. And the routing module is configured to instruct the forwarding module to forward the multicast stream to the outgoing interface, wherein the multicast stream is received via the second incoming interface.

In a third aspect, a system for re-routing a multicast stream is provided. The system includes a multicast source connected to a first router, a multicast receiver connected to a third router. The first and third routers are connected to each other and a second router. A multicast stream is re-routed from a prior multicast forwarding path to a new multicast forwarding path, wherein the multicast stream utilizes the prior multicast forwarding path until the new multicast forwarding path is operational. The first router and the third router define the new multicast forwarding path and the first, second and third router define the prior multicast forwarding path.

In certain embodiments of the invention, if a unicast route from a router to a multicast source or a rendezvous point changes, e.g., the best route takes the place of the second-best route, a multicast forwarding path will switch from a prior one to a new one. The router keeps forwarding a multicast stream via a prior multicast forwarding path until the multicast stream is received via a new multicast forwarding path. The prior multicast forwarding path is not pruned until the multicast stream is received via the new multicast forwarding path. Therefore, transmitting a multicast stream will not be broken during the switchover process.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DESCRIPTION OF THE PREFERRED EMBODIMENTS

In embodiments of the present invention, if a unicast route to a multicast source or a rendezvous point (RP) changes, for example, the unicast route changes from the second-best route to the best route, a PIM router will keep forwarding a multicast stream received from an old incoming interface until the multicast stream is received from a new incoming interface. Until the multicast stream reaches the new incoming interface, the PIM router will not send a Prune message to an old upstream router corresponding to the old incoming interface, and the PIM router will not ignore or terminate the multicast stream received from the old incoming interface. Therefore, the multicast stream will be transmitted continuously during the switchover process.

Figure 1:
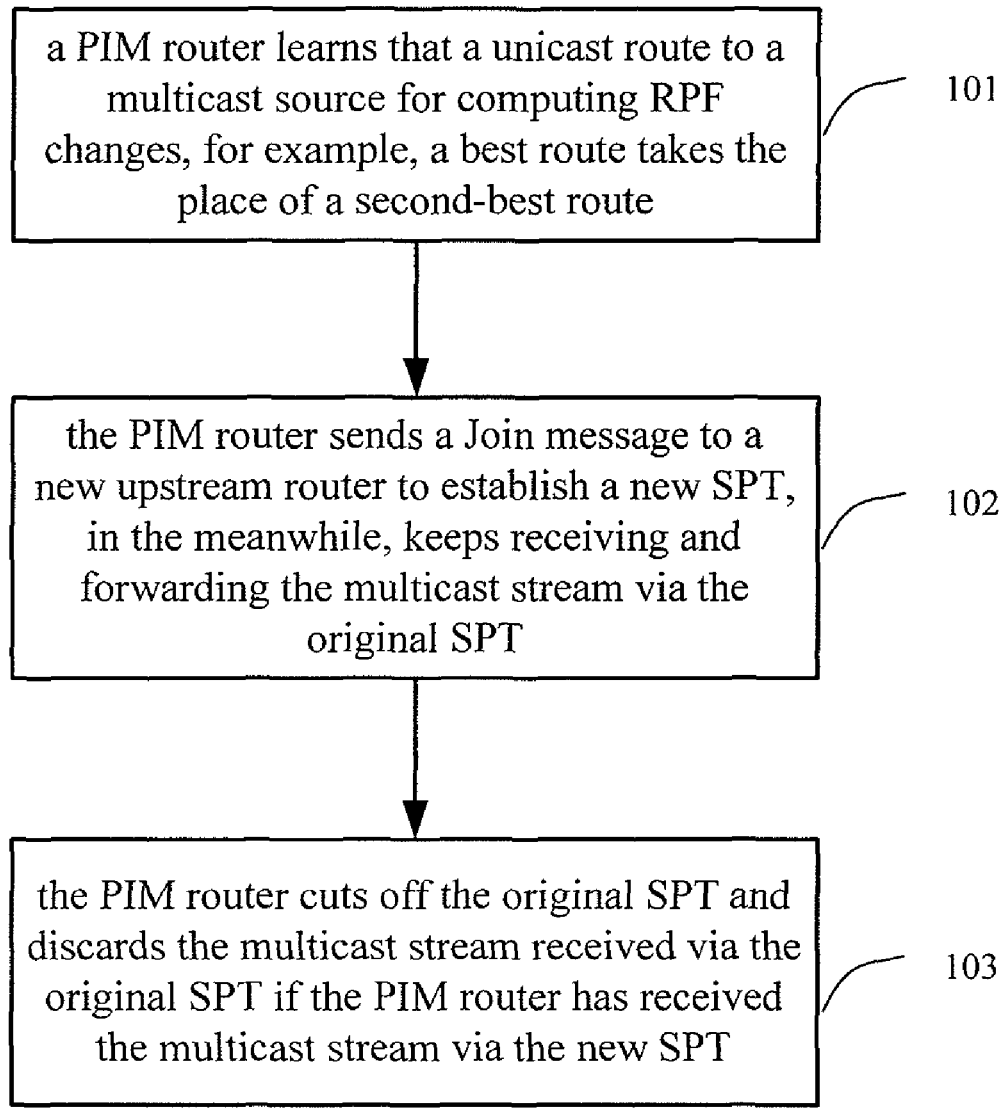
FIG. 1 is a flowchart illustrating a method for re-routing a multicast stream by a PIM router if a unicast route to a multicast source changes in accordance with an exemplary embodiment of the present invention.

FIG. 1 is a flowchart illustrating a method for re-routing a multicast stream by a PIM router if a unicast route to a multicast source changes in accordance with an exemplary embodiment of the present invention. As shown in FIG. 1, the method is detailed as follows:

In block 101, a PIM router learns that a unicast route to a multicast source changes, for example, a best route takes the place of a second-best route.

In block 102, the PIM router sends a Join message to a new upstream router corresponding to the best route so as to establish a new SPT. Meanwhile, the PIM router keeps receiving a multicast stream and forwarding the multicast stream via a prior SPT.

In block 103, if the PIM router receives the multicast stream via the new SPT, the PIM router forwards the multicast stream via the new SPT. The PIM router will also send a Prune message to an old upstream router corresponding to the prior SPT to prune the prior SPT, and the PIM router ignores or terminates the multicast stream received via the prior SPT.

The above method for re-routing a multicast stream is implemented by a system for re-routing a multicast stream according to embodiments of the present invention. In an embodiment of the present invention, a system for re-routing a multicast stream includes a multicast source, a multicast receiver and more than one PIM routers for forwarding a multicast stream. In these routers, there are a head-end router is connected to the multicast source, a tail-end router is connected to the multicast receiver and other intermediate routers connected to one another between the head-end router and the tail-end router. A multicast stream from the multicast source reaches the multicast receiver via a multicast forwarding path formed by the routers.

A system including three routers for re-routing a multicast stream is detailed according to an embodiment of the present invention.

Figure 2:
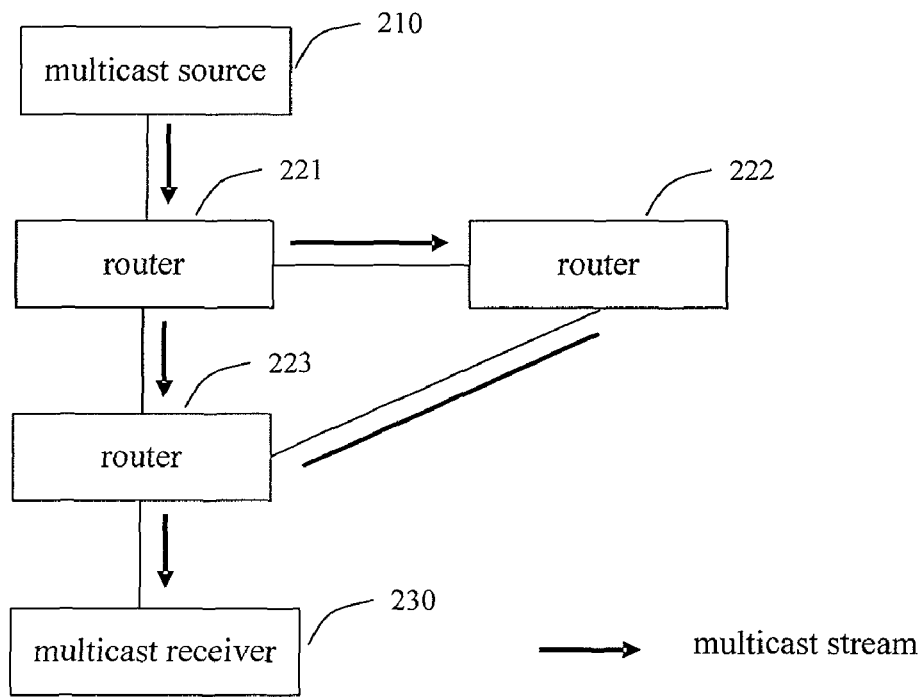
FIG. 2 is a simplified block diagram illustrating a system for re-routing a multicast stream in accordance with an exemplary embodiment of the present invention.

FIG. 2 is a simplified block diagram illustrating a system for re-routing a multicast stream in accordance with an exemplary embodiment of the present invention. As shown in FIG. 2, the system includes a multicast source 210, a multicast receiver 230, and three PIM routers: router 221, router 222 and router 223. Router 221 is connected to the multicast source 210. Router 223 is connected to the multicast receiver 230. Router 222 is connected to router 221 and router 223. Router 221 is connected to router 223.

During an SPT switchover caused by a change of a unicast route to a multicast source, for example, a best route takes the place of a second-best route. A multicast stream re-routing process is detailed below.

Figure 3:
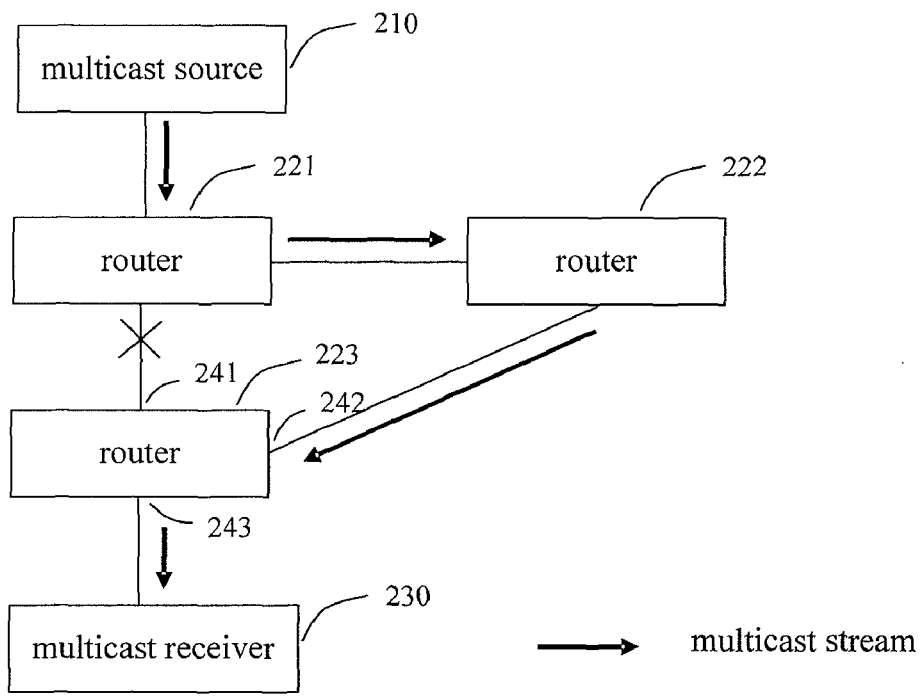
FIG. 3 is a simplified block diagram illustrating a system for transmitting a multicast stream, shown before a unicast route has changed in accordance with an exemplary embodiment of the present invention.

FIG. 3 is a simplified block diagram illustrating a system for transmitting a multicast stream, shown before a unicast route has changed in accordance with an exemplary embodiment of the present invention. As shown in FIG. 3, the link between router 221 and router 223 is not operational. For router 223, the next hop to the multicast source 210 is router 222, while for router 222, the next hop to the multicast source 210 is router 221. Router 221, router 222 and router 223 send Join messages periodically via the shortest path to the multicast source 210. An SPT is established and maintained. The multicast stream is sent from the multicast source 210 to the multicast receiver 230 via the established SPT. In other words, the SPT is router 221->router 222->router 223. Router 223 receives the multicast stream via incoming interface 242. Incoming interface 242 is an incoming interface on router 223 connected to router 222.

Figure 4:
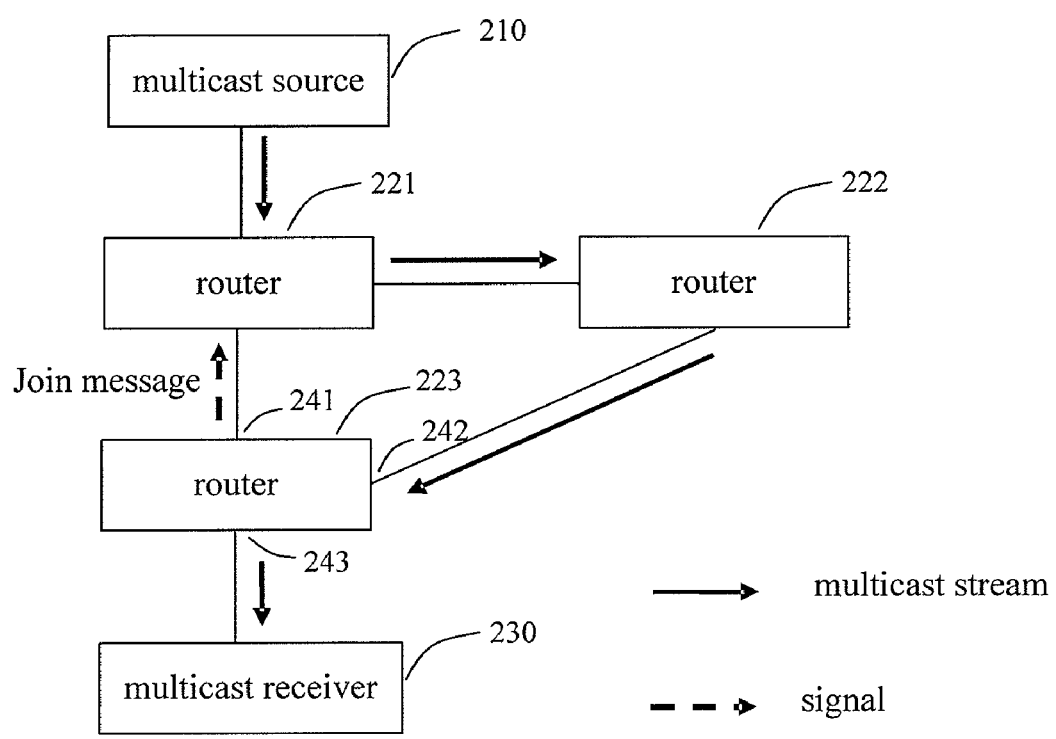
FIG. 4 is a simplified block diagram illustrating a system for re-routing a multicast stream when a unicast route changes in accordance with an exemplary embodiment of the present invention.

If the link between router 221 and router 223 becomes operational, router 223 learns that the unicast route to the multicast source has changed. In other words, the best route (router 221->router 223) takes the place of the second-best route 10 (router 221->router 222->router 223). The next hop to the multicast source 210 for router 223 changes from router 222 to router 221. Router 223 sends a Join message to router 221 which is a new upstream router via a new incoming interface 241. As shown in FIG. 4, a new SPT is established from router 221 to router 223. Router 223 keeps forwarding the multicast stream received from the old incoming interface 242 until router 223 receives the multicast stream from the new incoming interface 241.

Figure 5:
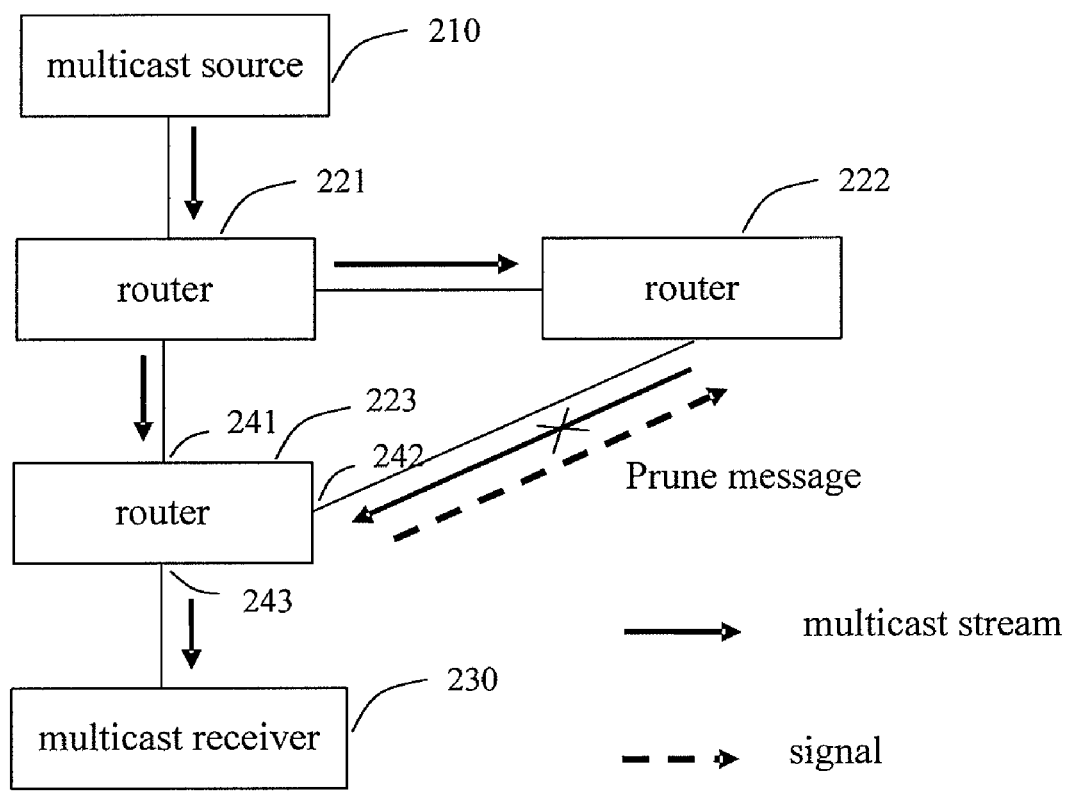
FIG. 5 is a simplified block diagram illustrating a system for transmitting a multicast stream after a unicast route changes in accordance with an exemplary embodiment of the present invention.

If router 223 receives the multicast stream via the new incoming interface 241, as shown in FIG. 5, router 223 may immediately prune the prior SPT by sending a Prune message to the old upstream router 222. And router 223 ignores the multicast stream received via the incoming interface 242 from then on. Therefore it may be avoided that the duplicate multicast stream received via the incoming interfaces 241 and 242 causes a mistake on the multicast receiver. Router 223 forwards the multicast stream to the multicast receiver 230 via the old outgoing interface 243 wherein the multicast stream is received via the incoming interface 241.

Figure 6:
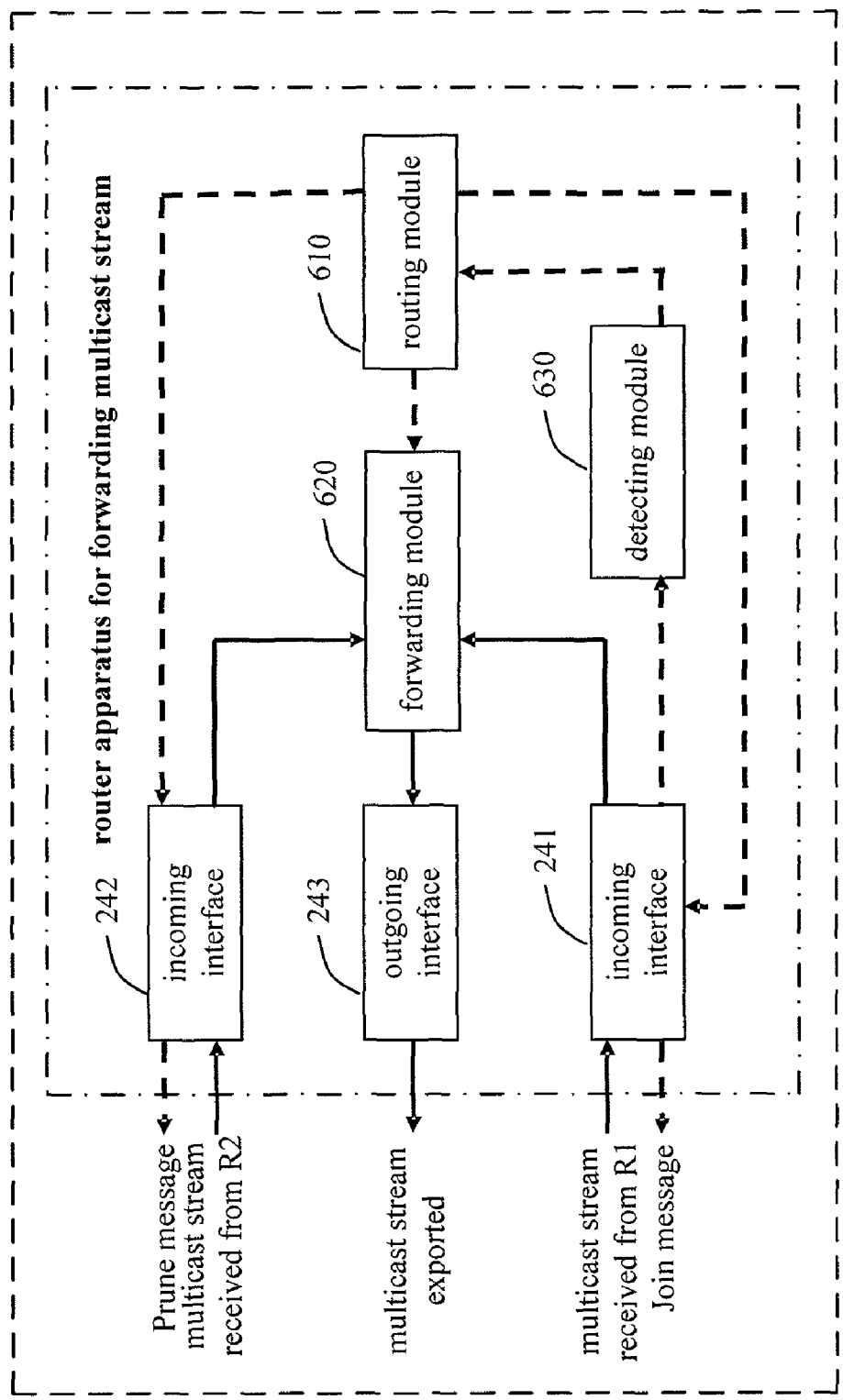
FIG. 6 is a simplified block diagram depicting the structure of a router apparatus in accordance with an exemplary embodiment of the present invention.

FIG. 6 is a simplified block diagram depicting the structure of a router apparatus in accordance with an exemplary embodiment of the present invention. As shown in FIG. 6, the above-mentioned routers such as router 223 includes a routing module 610, a forwarding module 620, a detecting module 630 and more than one incoming/outgoing interface such as incoming interface 241, incoming interface 242 and outgoing interface 243. The forwarding module 620 is connected to the incoming interfaces 241, 242 and the outgoing interface 243 and is configured to forward a multicast stream. The routing module 610 is connected to the incoming interfaces 241 and 242 and is configured to instruct the incoming interface 241/242 to establish or prune a multicast forwarding path corresponding to the incoming interface 241/242. The routing module 610 is connected to the forwarding module 620 and is configured to instruct the forwarding module 620 to forward the multicast stream. The detecting module 630 is connected to the incoming interface 241 and the routing module 610. The detecting module 630 is configured to detect a condition of receiving the multicast stream via the incoming interface 241. As shown in FIG. 6, solid lines denote the multicast stream while broken lines denote a signal.

Correspondingly, during an SPT switchover caused by a change of a unicast route to a multicast source, for example, the best route takes the place of the second-best route. A process for re-routing a multicast stream is detailed as follows:

Originally, the link between router 223 and router 221 is not operational. A multicast stream is transmitted from the multicast source 210 to the multicast receiver 230 via an prior SPT (router 221 ->router 222 ->router 223). Router 223 receives the multicast stream via the incoming interface 242 connected to the upstream router 222. The forwarding module 620 sends the multicast stream to the multicast receiver 230 via an outgoing interface designated by the routing module 610.

Once the route to the multicast source 210 switches from the second-best route to the best route, in other words, the link between router 221 and router 223 becomes operational, the routing module 610 sends a Join message (e.g., a PIM Join message) to router 221 via the incoming interface 241 connected to router 221 and establishes a new SPT from router 221 to router 223. And the routing module 610 instructs the incoming interface 242 connected to router 222 to keep receiving the multicast stream.

As the detecting module 630 detects that the multicast stream is received via the incoming interface 241, the detecting module 630 will inform the routing module 610. The routing module 610 sends a Prune message (e.g., a PIM Prune message) to router 222 to prune the prior SPT and instruct the forwarding module 620 to ignore the multicast stream received via the incoming interface 242 from then on. The routing module 610 instructs the forwarding module 620 to forward the multicast stream received via the incoming interface 241 to the multicast receiver 230 via an outgoing interface designated by the routing module.

The above embodiments of the invention take PIM-SM as an example and detail the process of re-routing a multicast stream when a unicast route to a multicast source changes, e.g., the best route takes the place of the second-best route. In the case that PIM-SSM is adopted, if a unicast route to a multicast source changes, e.g., the best route takes the place of the second-best route, the process of re-routing a multicast stream is similar to the process detailed above. In the case that PIM-SM is adopted and a multicast stream is forwarded via an RPT, if a unicast route to an RP changes, for example, the best route takes the place of the second-best route, the process of re-routing a multicast stream is similar to the process detailed above.

In certain embodiments of the invention, if a unicast route to a multicast source changes, e.g., the best route takes the place of the second-best route, a PIM router keeps forwarding a multicast stream received via the old incoming interface until the multicast stream is received via a new incoming interface. When the multicast stream is received via the new incoming interface, the PIM router sends a Prune message to its old upstream router and prunes the prior multicast forwarding path. Therefore, the multicast stream transmitting will not be interrupted. In certain embodiments of the invention, if the multicast stream is received via the new incoming interface, the PIM router ignores or terminates the multicast stream received via the old incoming interface. Therefore, mistakes in receiving and playback of the multicast stream will not be caused by receiving the multicast stream via both the old incoming interface and the new incoming interface.

Although preferred embodiments are disclosed herein, many variations, alternatives and substitutions are possible which remain within the concept, scope, and spirit of the invention, and these variations would become clear to those skilled in the art after perusal of this application. Accordingly, it is not intended to limit the invention except as provided by the appended claims.

What is claimed is:

1. A method for re-routing a multicast stream when a unicast route to a multicast source or a rendezvous point changes from a first route to a second route, wherein the first route is corresponding to a prior multicast forwarding path between a first upstream router and a downstream router, the second route is corresponding to a new multicast forwarding path between a second upstream router and the downstream router, a multicast stream is forwarded via the prior multicast forwarding path, the method comprising:

establishing the new multicast forwarding path between the downstream router and the second upstream router;

keeping receiving said multicast stream from the first upstream router via a first incoming interface corresponding to said prior multicast forwarding path and forwarding the multicast stream via said prior multicast forwarding path before the multicast stream forwarded via the new multicast forwarding path is received by the downstream router; and pruning said prior multicast forwarding path once the multicast stream forwarded via the new multicast forwarding path is received by said downstream router.

2. The method of claim 1, further comprising:
terminating said multicast stream received via said prior multicast forwarding path once said multicast stream is received via said new multicast forwarding path by said downstream router.

3. The method of claim 1, further comprising:
ignoring said multicast stream received via said prior multicast forwarding path once said multicast stream is received via said new multicast forwarding path by said downstream router.

4. The method of claim 1, wherein said establishing a new multicast forwarding path between a downstream router and a second upstream router comprises:
sending a Join message via a second incoming interface connected to said second upstream router; and
establishing said new multicast forwarding path from said second upstream router to said second incoming interface.

5. The method of claim 1, wherein said re-routing a multicast stream from said prior multicast forwarding path to said new multicast forwarding path comprises:
receiving said multicast stream via said second incoming interface by said downstream router; and
forwarding said multicast stream to a downstream device of said downstream router via an outgoing interface designated by said downstream router.

6. The method of claim 1, wherein said pruning said prior multicast forwarding path comprises:
sending a Prune message to the first upstream router via the first incoming interface; and
pruning said prior multicast forwarding path from said first upstream router to said first incoming interface.

7. The method of claim 1, wherein said establishing the new multicast forwarding path between the downstream router and the second upstream router comprises:
when said prior multicast forwarding path is a source path tree, establishing a new source path tree if the unicast route from said downstream router to the multicast source of said multicast stream is changed from said first route to said second route.

8. The method of claim 7, wherein said unicast route from said downstream router to said multicast source of said multicast stream is changed from said first route to said second route comprises:
said unicast route from said downstream router to said multicast source of said multicast stream is changed from a second-best route to a best route.

9. The method of claim 1, wherein said establishing the new multicast forwarding path between the downstream router and the second upstream router comprises:
when said prior multicast forwarding path is a rendezvous point tree, establishing a new rendezvous point tree if the unicast route from said downstream router to the rendezvous point of said multicast stream is changed from said first route to said second route.

10. The method of claim 9, wherein the unicast route from said downstream router to the rendezvous point of said multicast stream is changed from said first route to said second route comprises:
said unicast route from said downstream router to said rendezvous point of said multicast stream is changed from a second-best route to a best route.

11. A downstream router for re-routing a multicast stream when a unicast route to a multicast source or a rendezvous point changes from a first route to a second route, the downstream router comprising:
a routing module, a forwarding module, a detecting module, an outgoing interface, a first incoming interface, and a second incoming interface, wherein:
said first and second incoming interfaces are configured to receive a multicast stream from upstream routers, said first incoming interface is in communication with a first upstream router corresponding to the first route, and said second incoming interface is in communication with a second upstream router corresponding to the second route;
said outgoing interface is configured to forward said multicast stream to a downstream device;
said forwarding module is configured to forward said multicast stream to said outgoing interface pursuant to an instruction of said routing module wherein said multicast stream is received via an incoming interface designated by said routing module;
said detecting module is configured to detect whether said multicast stream is received via said second incoming interface;
said routing module is configured to
send a first instruction to establish a new multicast forwarding path corresponding to said second route via said second incoming interface when the unicast route from the downstream router to the multicast source or the rendezvous point changes from said first route to said second route,
send a second instruction for pruning a prior multicast forwarding path corresponding to said first route via said first incoming interface after receiving said multicast stream via said second incoming interface,
instruct said forwarding module to forward said multicast stream to said outgoing interface, wherein said multicast stream is received via said second incoming interface, and
inform said first incoming interface to terminate said multicast stream received via said first incoming interface when said routing module is informed that said detecting module detects that said multicast stream is received via said second incoming interface.

12. The downstream router of claim 11, wherein said routing module is configured to send a Join message to said second upstream router via said second incoming interface to establish said new multicast forwarding path.

13. The downstream router of claim 11, wherein said routing module is configured to send a Prune message to said first upstream router via said first incoming interface to prune said prior multicast forwarding path.

14. A system for re-routing a multicast stream when a unicast route to a multicast source or a rendezvous point changes, the system comprising:
a downstream router for re-routing a multicast stream when a unicast route to a multicast source or a rendezvous point changes from a first route to a second route, the downstream router comprising:
a routing module, a forwarding module, a detecting module, an outgoing interface, a first incoming interface, and a second incoming interface, wherein:
said first and second incoming interfaces are configured to receive a multicast stream from upstream routers, said first incoming interface is in communication with a first upstream router corresponding to a first route, and said second incoming interface is in communication with a second upstream router corresponding to a second route;

said outgoing interface is configured to forward said multicast stream to a downstream device;

said forwarding module is configured to forward said multicast stream to said outgoing interface pursuant to an instruction of said routing module wherein said multicast stream is received via an incoming interface designated by said routing module;

said detecting module is configured to detect whether said multicast stream is received via said second incoming interface;

said routing module is configured to send a first instruction to establish a new multicast forwarding path corresponding to said second route via said second incoming interface when the unicast route from the downstream router to the multicast source or the rendezvous point changes from said first route to said second route, said routing module is configured to send a second instruction for pruning a prior multicast forwarding path corresponding to said first route via said first incoming interface after receiving said multicast stream via said second incoming interface, said routing module is configured to instruct said forwarding module to forward said multicast stream to said outgoing interface, wherein said multicast stream is received via said second incoming interface, and said routing module is configured to inform said first incoming interface to terminate said multicast stream received via said first incoming interface when said routing module is informed that said detecting module detects that said multicast stream is received via said second incoming interface;

a multicast source;

a first upstream router connected with the multicast source;

a second upstream router;

a multicast receiver connected to the downstream router, wherein the first upstream router and the downstream router are connected to each other and the second upstream router and wherein the multicast stream is re-routed from a prior multicast forwarding path to a new multicast forwarding path, wherein said multicast stream utilizes said prior multicast forwarding path until said downstream router receives said multicast stream from said second upstream router.

15. The system of claim 14, wherein said routing module is configured to send a Join message to said second upstream router via said second incoming interface to establish said new multicast forwarding path.

16. The system of claim 14, wherein said routing module is configured to send a Prune message to said first upstream router via said first incoming interface to prune said prior multicast forwarding path.

* * * * *